Figure 1:
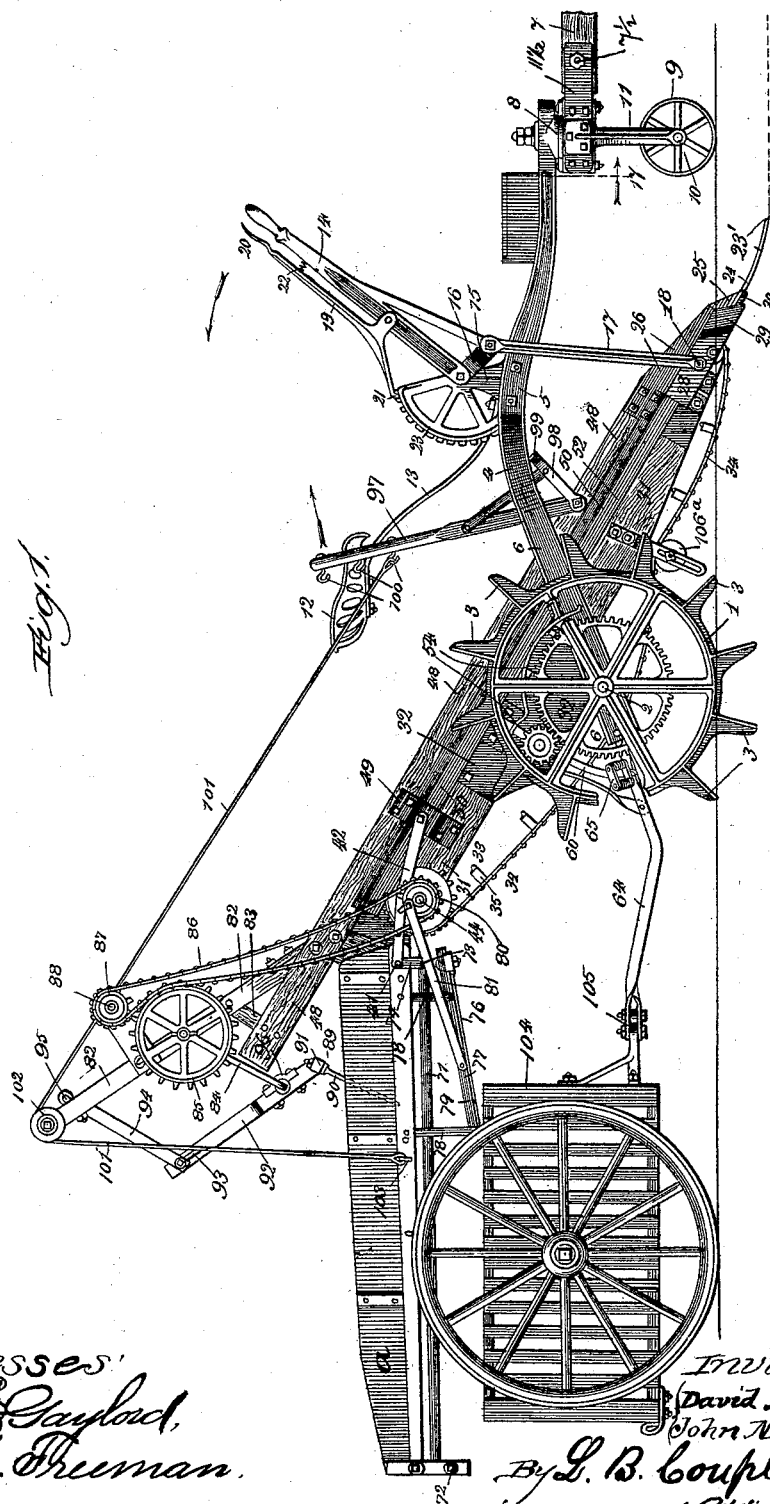

(No Model.)  6 Sheets—Sheet 1.

D. & J. NEWBERRY.
POTATO HARVESTER.

No. 455,599. Patented July 7, 1891.

Witnesses:
Chs. E. Gaylord,
L. M. Freeman.

Inventors:
David Newberry,
John Newberry,
By L. B. Coupland & Co.
Att'ys (No Model.) 6 Sheets—Sheet 2.

D. & J. NEWBERRY.
POTATO HARVESTER.

No. 455,599. Patented July 7, 1891.

Witnesses:
Inventors:
David Newberry,
John Newberry,
By L. B. Coupland & Co.
Attys

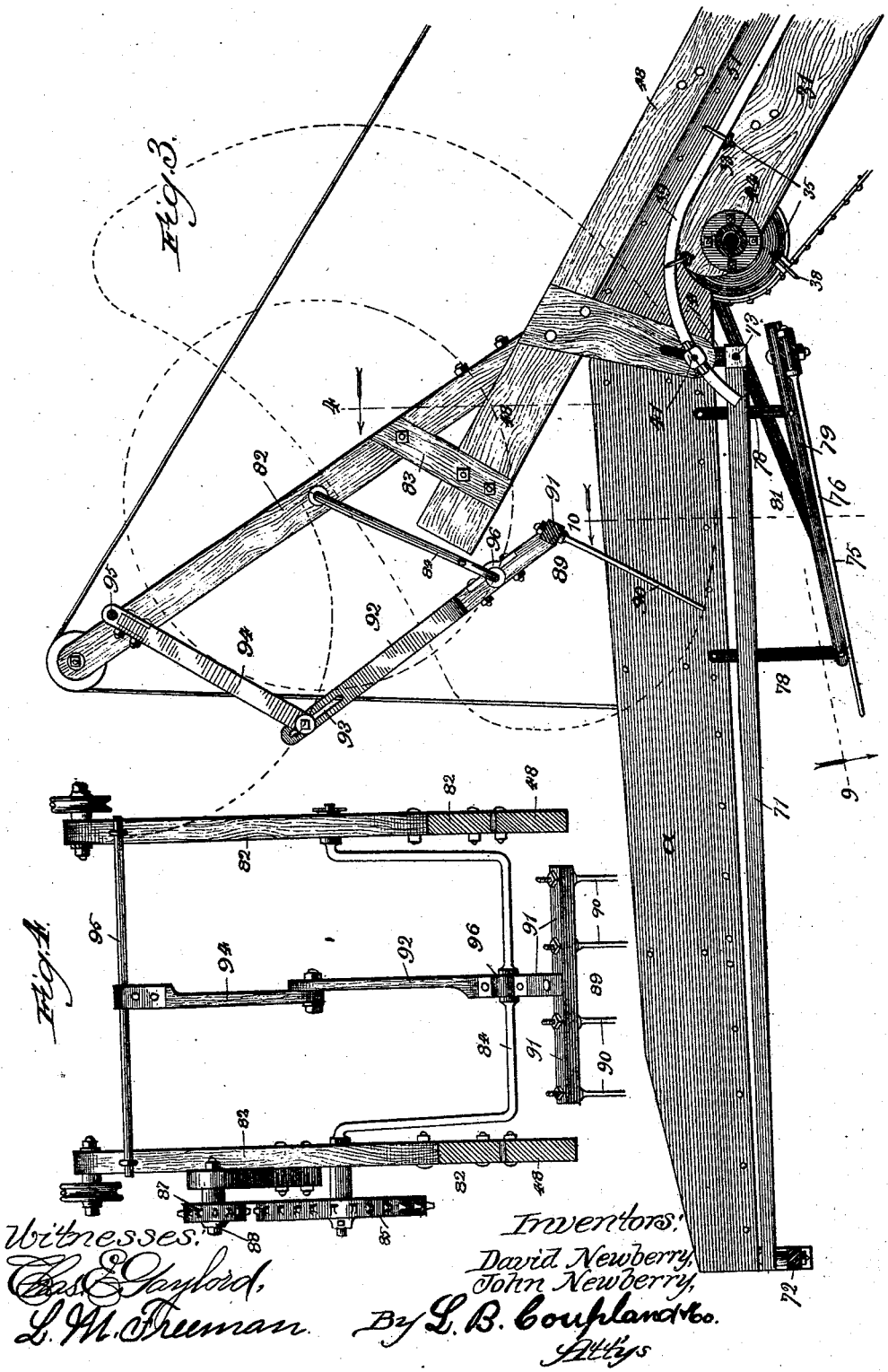

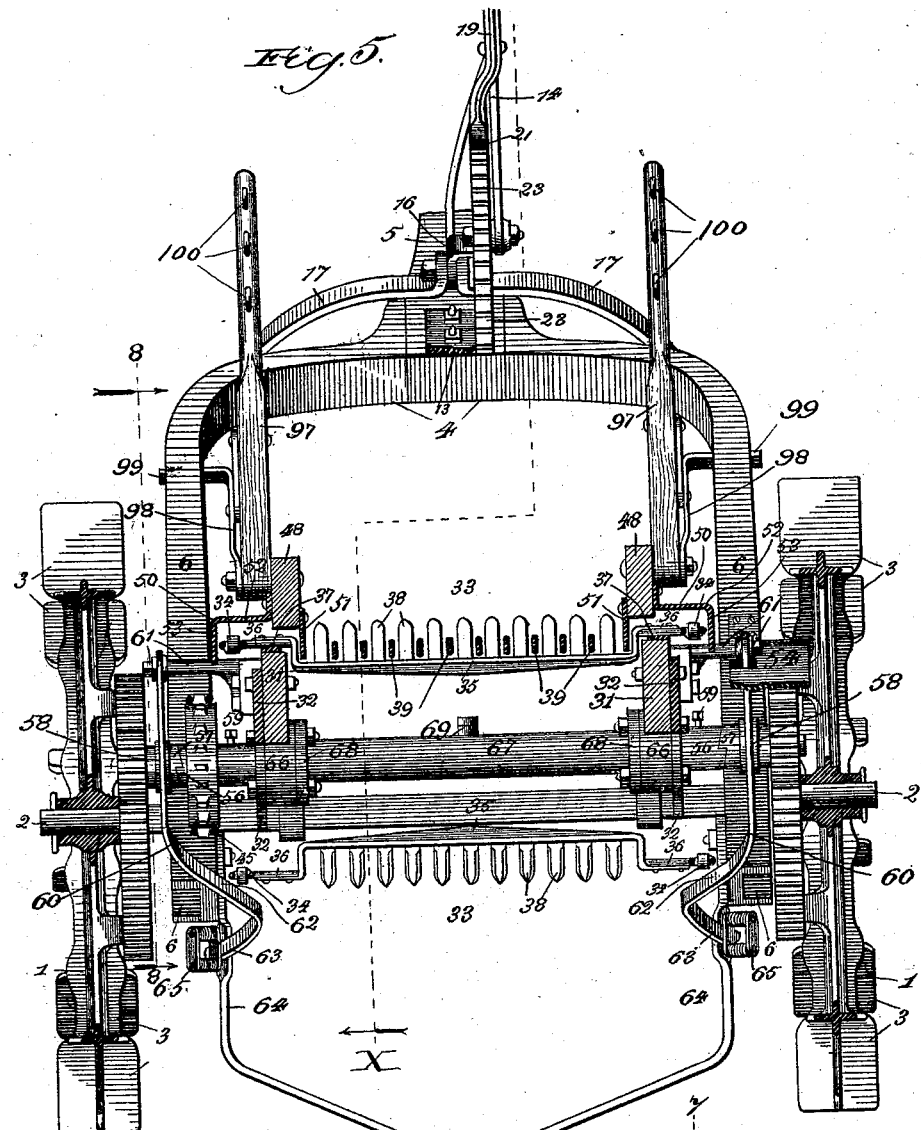

(No Model.) 6 Sheets—Sheet 5.
D. & J. NEWBERRY.
POTATO HARVESTER.
No. 455,599. Patented July 7, 1891.
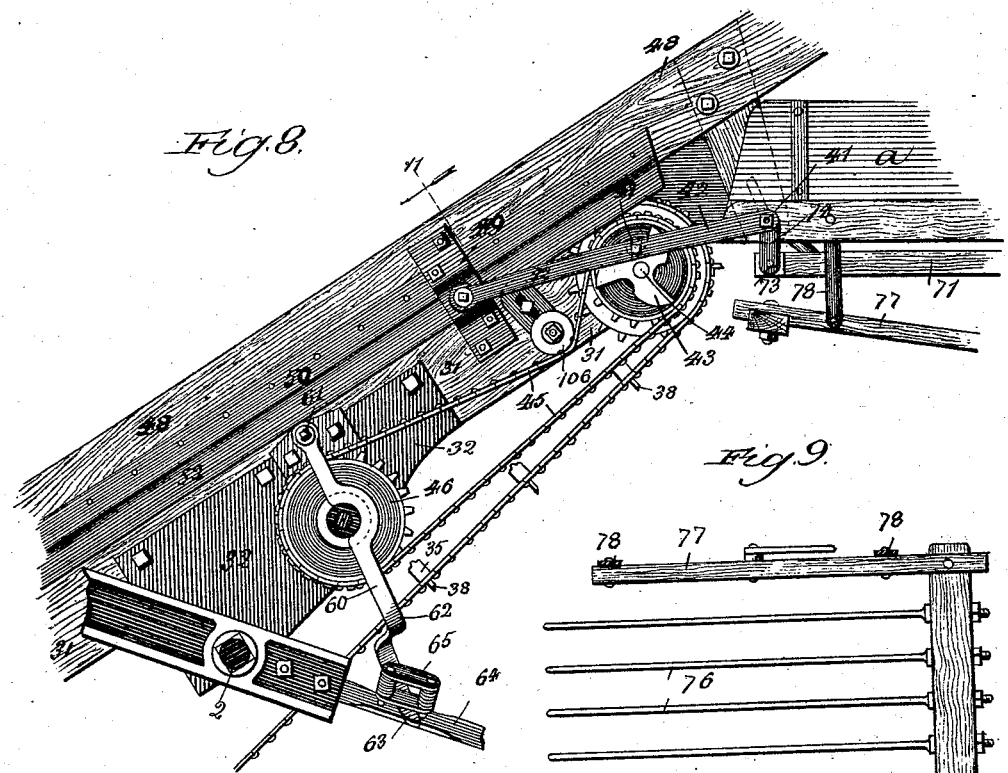
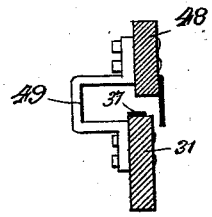
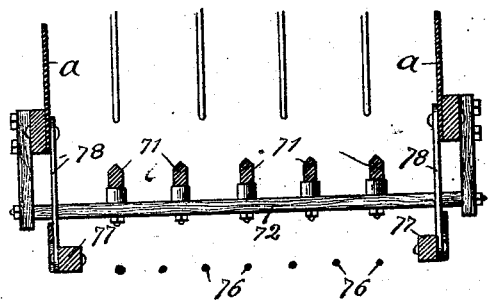
Witnesses:
Chas E Gaylord,
L. M. Freeman.
Inventors:
David Newberry,
John Newberry,
By L. B. Coupland & Co.
Atty's (No Model.) 6 Sheets—Sheet 6.
D. & J. NEWBERRY.
POTATO HARVESTER.
No. 455,599. Patented July 7, 1891.
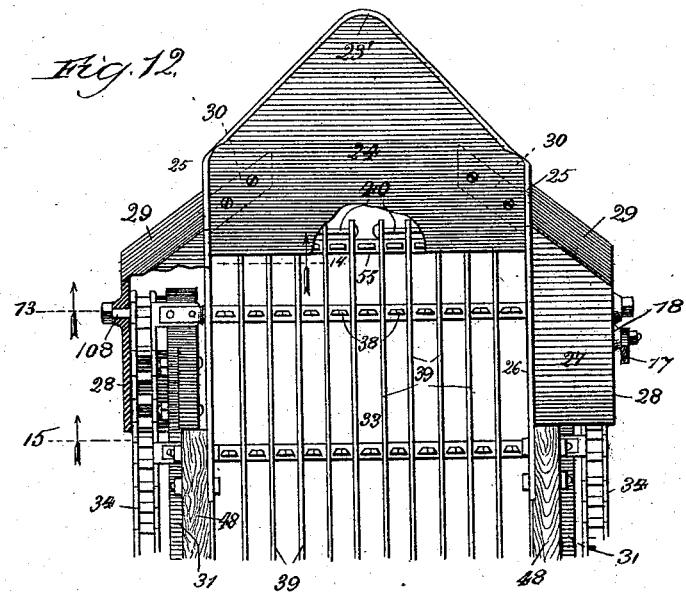
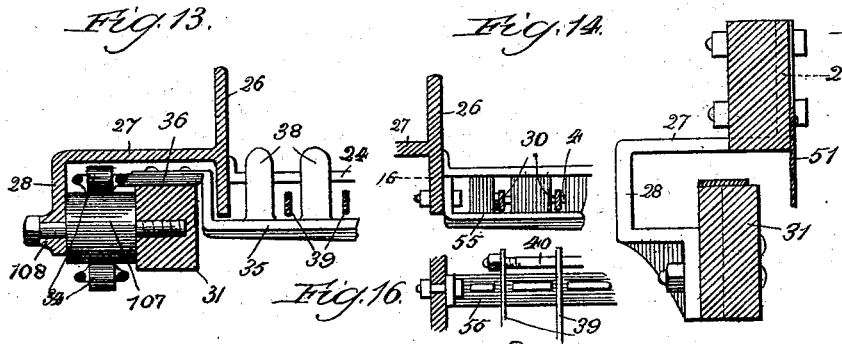
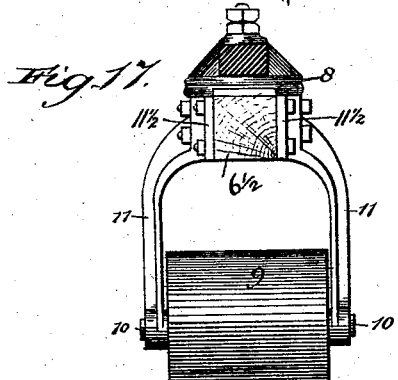
Witnesses:
Chs. E. Gaylord,
L. M. Freeman.
Inventors:
David Newberry,
John Newberry,
By L. B. Coupland & Co.
Attys

UNITED STATES PATENT OFFICE.

DAVID NEWBERRY AND JOHN NEWBERRY, OF VERNON, MICHIGAN.

POTATO-HARVESTER.

SPECIFICATION forming part of Letters Patent No. 455,599, dated July 7, 1891.

Application filed May 28, 1889. Serial No. 312,452. (No model.)

*To all whom it may concern:*

Be it known that we, DAVID NEWBERRY and JOHN NEWBERRY, both citizens of the United States, residing at Vernon, in the county of Shiawassee and State of Michigan, have invented certain new and useful Improvements in a Potato-Harvester, of which the following is a full, clear, and exact description, that will enable others to make and use the same, reference being had to the accompanying drawings, forming a part of this specification.

Our invention relates to a potato-harvesting machine, and has for its object to provide and adapt a machine of this character which shall be as simple in construction and operation as possible, durable and reliable in use, and cheap in first cost and maintenance.

The salient and essential features of our improvement in brief are: means for digging, uprooting, and unearthing the potatoes and the adherent or accompanying débris from the ground and forcing the same back upon a chute or elevator, which is so constructed and arranged as to convey the same upwardly to an agitator and separator located in operative relation to said chute or elevator. The potatoes and their adherent dirt and vines in their ascent through the chute or elevator are carried by means of an endless belt or chain having a series of fingers or teeth so arranged as to retain and hold the ascending load and deposit it at the proper time and in the requisite manner into the before-mentioned agitator. During the ascent through the chute the potatoes are freed and separated to a certain extent from the objectionable vines and dirt by being shaken or agitated through the agency of suitable mechanism hereinafter described, and when thrown upon the agitator drop down on a series of grate-bars constituting the bottom thereof and composed of a number of bars placed sufficiently far apart to permit of the passage of the potatoes therebetween, but preventing the descent of the vines, weeds, and large clods of dirt which have remained after the ascent over the agitating mechanism of the elevating-chute. In other words, the fine dirt, dust, and other débris is shaken off in the ascent through the elevator, while the larger clods, tangled vines, and weeds are separated from the potatoes in the agitator.

Contemporaneously with the operation of the separator and agitator the vines, weeds, &c., remaining on top of the grate-bars of the latter are swept off and out of the way by a revolving rake, which in turn is actuated by the main motive power of the machine derived from the travel of the vehicle. The potatoes now being separated as much as possible from the refuse matter by the aforesaid instrumentalities fall through the grate-bars upon another set of grate-bars beneath, which constitute a combined separator and dumping-chute—*i. e.*, the distance between any two bars thereof is not sufficiently wide to permit the exit of the potatoes, as in the preceding case, but allows any fine dirt, dust, &c., remaining commingled with the potatoes to sift through. It is not actually necessary that the vibratory or riddle action of the agitator-grate should be continuous; but the same may remain stationary, except when the earth is very wet or unusually heavy and cloddy. The chute is continuously agitated by approved means, and is placed in an oblique horizontal plane, thereby causing the superincumbent load to slide off by its own weight into the wheeled cart or receptacle attached to the rear of the machine and arranged properly with relation to the mouth of the chute.

Our invention consists, further, in numerous other auxiliary features of construction, arrangement, and combination of parts, all of which will be more fully described hereinafter, and the specific points of novelty in which will be particularly designated in the appended claims.

In the accompanying drawings we have shown adequate means for operatively and successfully carrying out our invention. In practice, however, we wish it understood that we do not limit ourselves to the identical features of construction shown, since many parts may be varied and changed at pleasure without materially deviating from the spirit and scope of our invention as defined and set forth in the claims hereunto annexed.

Figure 2:
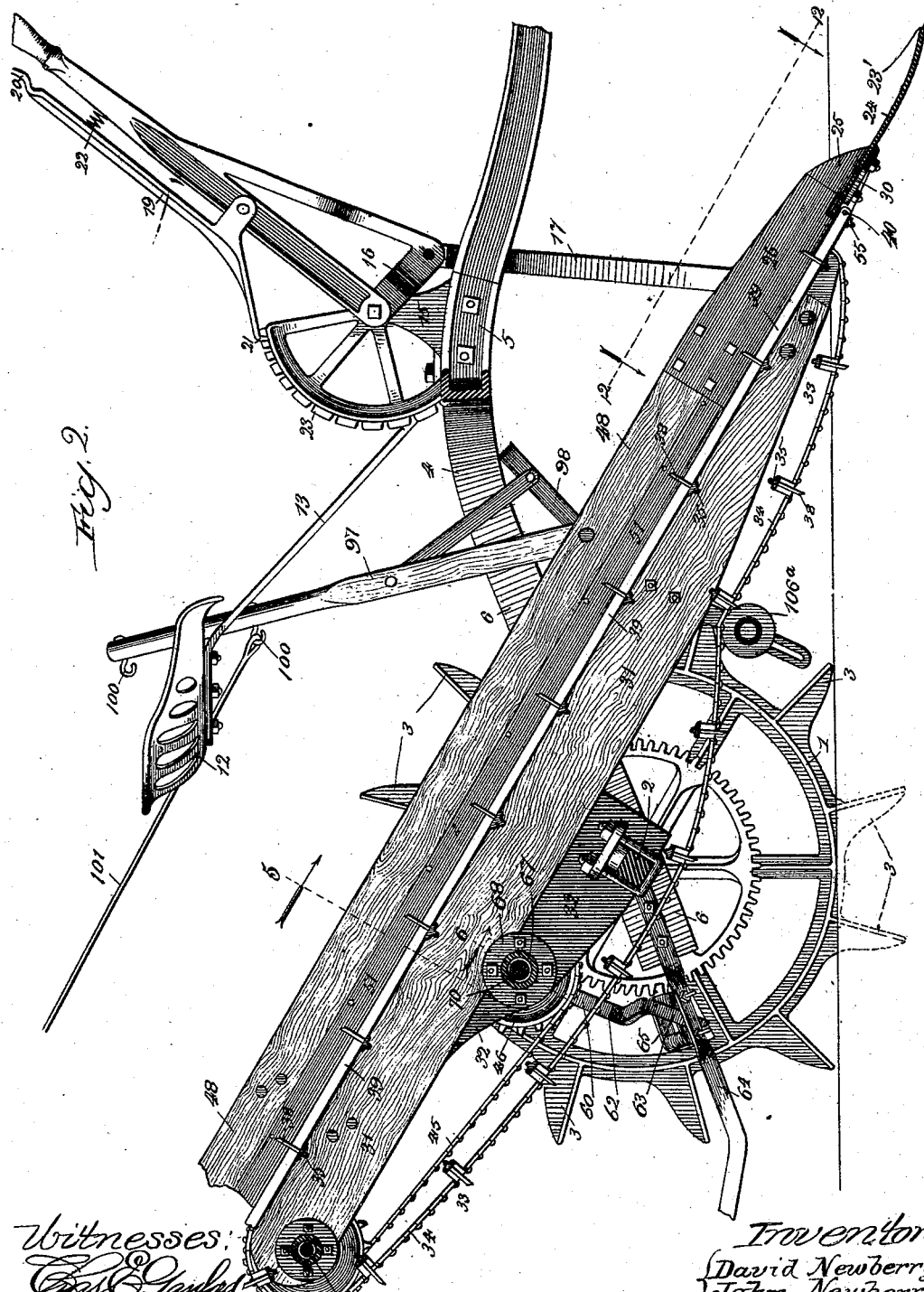

Referring to the drawings, Figure 1 is a longitudinal side elevation, showing the entire machine with all its parts in proper position and arrangement for operation. Fig. 2 is a longitudinal central vertical section of the main portion of the machine, the rear portion being omitted. Fig. 3 is an enlarged detail side elevation of the agitator and separator, (being a continuation of Fig. 2,) the dumping-chute, and the revolving rake, the plane of rotation of which latter is shown in dotted lines. Fig. 4 is a detail top plan view taken on the plane 4, Fig. 3, showing only the revolving rake and its operating parts. Fig. 5 is a transverse sectional view taken on plane 5 of Fig. 2 and showing the front portion of the machine in elevation. Fig. 6 is a detail sectional view of the main shaft of the machine and its attached parts, and is taken on plane 6 of Fig. 2. Fig. 7 is a transverse section on plane 7, Fig. 6. Fig. 8 is an enlarged detail view with parts omitted, partly in section and partly in elevation, and taken in plane 8 of Fig. 5. Fig. 9 is a top plan view of the dumping-chute, taken on plane 9 of Fig. 3. Fig. 10 is a vertical transverse section on plane 10 of Fig. 3. Fig. 11 is a detail vertical section on plane 11 of Fig. 8. Fig. 12 is an enlarged top plan view of the extreme front portion of the machine, taken on plane 12 of Fig. 2. Figs. 13, 14, and 15, respectively, are sectional views taken severally on planes 13, 14, and 15 of Fig. 12. Fig. 16 is a detail section on plane 16, Fig. 14. Fig. 17 is an enlarged detail view of the guiding-roller and its fifth-wheel at the front of the machine directly in line with the shovel.

Referring to the drawings by numbers, 1 indicates the drive-wheels of the machine, there being one on each side, as shown, mounted on the axle-spindle 2, attached to the frame-work, which serves to support and carry all the superincumbent portions and parts of the machine, which in turn are attached thereto in the requisite manner, as will hereinafter appear.

The drive-wheels 1 1 are provided around their respective peripheries with radially-projecting traction blades or spurs 3 3, serially arranged and designed to penetrate the ground over which the vehicle travels and to thereby give the needed traction.

4 designates the yoke-beam of the machine, consisting of the curved front portion 5 and the two rearwardly-diverging arms or prongs 6 6, each of which extends back slightly beyond the axles or spindles 2 2. The yoke-piece 4 is flexibly connected to the tongue 7 through the intermediate fifth-wheel 8, which is of any ordinary or approved construction, and is supported by the ground-roller 9, which in turn is mounted on a shaft 10, having its bearings in the lower extremities of two depending arms or brackets 11 11, bolted at their upper ends to the plates 11½, which in turn are rigidly bolted to a wooden filling-block 6½, said block carrying the fifth-wheel 8, as shown clearly in Figs. 1 and 17. By means of this provision of the fifth-wheel 8 and the roller 9 the rigidity of the yoke 4 is insured and the machine is enabled to be turned and guided easily. Again, as shown in Fig. 17, the periphery or tread of the roller 9 is wide and solid, thus preventing the tipping or tilting of the same to one side. The tongue 7 is pivotally connected to the forwardly-extending plates 11½ by the horizontal pivot 7½, (shown in Fig. 1,) so as to permit it to rise and fall freely.

12 is the driver's seat mounted on the upper end of the oblique upright 13, which in turn is securely bolted or otherwise fastened at its lower extremity to the yoke 4. At or near the point of convergence of the two arms 6 6 and within convenient reach and manipulation of the operator is a hand-lever 14, fulcrumed at its lower end to the stud or bracket 15 and provided with the rigid rectangular extension 16, to which latter is loosely jointed the upper end of the link-rod 17, the lower end of which is secured flexibly to the front portion of the machine through the intermediate clip or stud 18. (See Figs. 1, 2, and 12.) Thus it will be seen that the hand-lever 14 is in reality a bell-crank lever in its action.

To the lever 14 is pivoted the pawl-lever 19, formed at its upper end into a handle 20, at its lower extremity into the pawl 21, and provided between its fulcrum-point and its handle with the retracting-spring 22. The pawl 21 works in the ratchet-teeth of the toothed sector-wheel 23, and which in turn is rigidly secured to the stud 15 and is in operative relation to the pawl-lever 21, so that by grasping the hand-lever 14 and the pawl-lever 19 the lever 14 may be permanently adjusted to any position within the range of the arc of the sector. It seems unnecessary to enter further into a detailed explanation of this arrangement for the reason that it is an ordinary construction, and it will be obvious to any one skilled in the art that the same is intended as a medium for regulating the position and depth of the shovel which enters the ground and unearths the potatoes.

23' is the plow or shovel, of the desired shape and size for the purpose, and comprises a triangularly-shaped point, as shown in Fig. 12, and the main portion 24, having the upright side flanges 25 25, (see Figs. 1, 2, and 12,) which latter are to prevent the force due to the action of the plow from laterally displacing the potatoes first lodged on the main portion 24.

Owing to the severe strain endured by the shovel in its action in the soil, an exceptionally strong means of attaching it to the main body of the machine must be provided, and to attain this end we have adopted the form of casting shown in Figs. 1, 2, 12, and 13 and made in the shape of a shoe consisting of the vertical flange 26, the horizontal plate 27, the lateral plate 28, the beveled portion 29, and the clip or ear 30, all of which are made in one irregularly-shaped casting. The main portion 24 of the shovel is bolted on each side to an ear 30 of the shoe, as shown clearly in Fig. 12, while the casting in turn is securely fastened to the main or side beams of the body of the machine, as shown clearly in the drawings. The beveled portion 29 of each casting is placed on the side of the shovel 23' for the purpose of deflecting and throwing off any impediment in the line of travel, such as a stone or other obstacle, while the horizontal and side plates 27 and 28 thereof serve in the dual capacity of dust-shields to the parts covered thereby and as strengthening and attaching mediums for the casting.

Referring to Figs. 1, 2, 5, 8, and 15, and more particularly to Figs. 5, 8, and 15, 31 indicates a strong timber or beam running longitudinally on each side the entire length of the front portion of the machine and secured by bolts to the metal wings or brackets 32, which in turn are journaled upon the main shaft, thus giving the said wings and their attached timbers an oscillating motion about the said shaft. These beams 31 31 constitute the side braces of the machine and are placed a distance apart approximately equal to the width of the endless traveler or carrier, which runs therebetween and is guided and supported in its passage by tracks respectively placed upon the upper surfaces of said beams 31 31.

33 designates the carrier, consisting of the two endless chain belts 34 34, having the transverse cross-bars 35 35, extending across between the two belts 34 34 and spaced predetermined distances apart, as shown in Fig. 1. Each cross-bar 35 is made substantially in the shape of a double crank with a crank-arm at each extremity—that is to say, the horizontal portion carrying the carrier-fingers is in a different horizontal plane from the extreme ends, which are in a higher plane. Furthermore, each cross-bar is slightly longer than the distance between the beams 31 31 and are fastened at their extremities to the said chain belts. Consequently it is manifest that on each side there is a horizontal arm, which projects laterally over the beam 31. Each one of these arms 36 travels in contact with a guide-rail 37, laid and secured upon the top surface of each beam 31. (See Fig. 5.) By this construction the carrier is guided and supported in its travel.

Upon each cross-bar 35 are placed a number of upwardly-projecting fingers 38 38, situated wide enough apart to allow the egress of dirt, yet sufficiently close to prevent the exit of the potatoes thrown back on the portion 24 by the force of the plow up to the agitator and separator.

Motion is suitably transmitted from the drive-wheels to the main shaft through intermediate gearing and to the chain belts 34 34 by sprocket-wheels, as shown clearly in the drawings. (See Figs. 1, 2, 5, and 8.) We do not, therefore, deem it necessary or essential to enter into a detailed description of the train of gearing shown for this purpose, since it forms no novel feature of our invention, and, moreover, may be of any simple and approved form.

Parallel with the beams 31 31, and in a slightly higher horizontal plane than that occupied by the ascent of the cross-bars 35 35, is placed a series of longitudinal grate-bars 39 39, running the entire length of the elevator-chute, terminating at the rear of the shovel 23' and placed the requisite distance apart to prevent the fall of the potatoes therethrough, yet wide enough to allow dirt, &c., to descend. These grate-bars are in two separate series, as shown in Fig. 12, each set on one side of the center of the chute, being bolted and held together at their ends by the horizontal connecting-rod 40, (see Fig. 16,) the object of this construction being to permit an independent and vertical motion of both sections of grate-bars, so as to prevent the stopping of the machine by obstructions.

As will be seen, when the potatoes are thrown into position on the portion 24 of the shovel they and all commingled matter will be caught and carried up the chute over the grate-bars by the fingers 38 38, projecting from underneath through the interstices of the grate-bars. Now, in accordance with the construction shown, the load is agitated in its upward travel by the action of the grate-bars, which are oscilated vertically by mechanism provided for that purpose and now to be described in connection with Fig. 8. At their upper extremities the grate-bars are all jointed to a transverse shaft 41, mounted in slotted bearings in the frame of the machine, so that said shaft is free to have a limited vertical movement in its bearings. As will be seen hereinafter, this shaft also serves as a hinge for the agitator and separator in the rear, as a support for the grate-bars of the latter, and as the means of communicating motion to the dumping-chute underneath the agitator and separator. To one extremity of this shaft 41 is loosely hinged one end of a lever 42, the other end of which is fulcrumed to the body of the vehicle.

43 designates a cam or eccentric keyed to the sprocket-shaft 44, to which latter rotary motion is communicated through the chain belt 45 and sprocket 46. On the lever 42, in operative relation to the cam 43, is a contact or friction roller 47, which is thrown up and down by the action of the cam. Consequently it will be seen that thus vertical oscillatory motion is transmitted to the grate-bars through the agency of the drive-wheels, the sprockets and chain belts, the lever 42, cam 43, the roller 47, and the shaft 41. By disconnecting and raising up one end of lever 42, so as to lift the roller 47 out of contact with the cam, the agitator will remain in a stationary position, so far as the vibratory motion is concerned.

Referring now to Fig. 5, 48 is a beam or timber similar to the lower beam 31, but placed in a higher horizontal plane and in a different vertical plane, the two upper timbers or beams 48 48 being slightly nearer together than the lower beams 31 31. Moreover, it will be noticed that there is an opening between the top edge of each beam 31 and the lower surface of its corresponding upper timber 48 to permit of the unobstructed passage of the carrier along the guide-rails. These two timbers 31 and 48 on each side are bound rigidly and securely together at intervals by the metallic shoe 49. (See Figs. 8 and 11.)

The tracks 37 37 on the beams 31 31 are shielded and protected from the dust and dirt from above by the dust-shields 50 and 51, respectively. The shield 50 is a longitudinal metallic strip covering the exterior lateral opening between the timbers 31 and 48 and is bolted securely to the beam 48, as shown. This shield 50 consists of two portions 52 53, the portion 52 being horizontal and extending out and protecting the chain belt, and the portion 53 depending vertically at right angles to the portion 52. The shield 51 is simply a straight metallic strip of the required size secured at its upper edge to the inner side of the beam 48 and depending vertically down below the surface of the upper edge of the beam 31. Aside from these two shields we have thought it advisable to provide the curved dust-shield 54, concentrically enveloping the gearing and other parts adjacent to the drive-wheels and fastened in the manner shown. (See Figs. 1 and 5.)

Directly in the rear of the portion 24 of the shovel 23' and inside of the connecting-rods 40 of the grate-bars 39 is placed a stationary cross-bar 55, provided with a number of upright fingers similar to those on the cross-bars 35 of the carrier, and serving to prevent the lodgment of potatoes, vines, weeds, or dirt beneath the shovel and beyond the reach of the carrier. This cross-bar 55 is bolted at each end to a portion of the casting which connects the shovel to the main body of the machine. (See Fig. 16.) Of course it is apparent that when the machine is coming from one place of operation to another or is going from the field to its destination it is desirable and even necessary to prevent idle motion and consequent wear, tear, and noise of the different component parts of the machine. Therefore we have provided means, which we will now proceed to describe, for preventing the rotary motion of the drive-wheels from being transmitted to the operative parts through the intermediate train of gearing.

On each end of the main shaft, intermediate of the gears and the journal-bearing, is placed a spring-actuated clutch consisting of two sleeves 56 57, the sleeve 56 being rigidly keyed to the shaft by a key-bolt 59, while the sleeve 57 is free to revolve independently of the shaft when not moving in unison with the sleeve 56.

On the sleeve 57 is formed the circular collar 58, having a peripheral slot therein, as shown in Fig. 6.

60 designates a strong spring tightly fastened at its upper end to the stud 61, while its lower extremity terminates in a compound arm consisting of the part 62 and the extreme curved tip 63, which extends obliquely downward and is confined between the rod 64 and the retaining spring-clamp 65. Each rod 64 is joined rigidly to and is a continuation of one of the arms 6 6 of the yoke-piece 4. Consequently when the shovel 23' is uplifted from contact with the ground, the spring being attached at its upper end to the main body of the elevator, (which is uplifted by the removal of the shovel from the ground,) its lower curved tip is forced in between the clamp 65 and rod 64, and the spring is thereby expanded obliquely outward, causing the sleeve 57 to be disengaged from sleeve 56, and therefore permitting the drive-wheels and gears to revolve without communicating motion to any of the sprocket-wheels.

Referring to Fig. 6, it will be seen that between the two journal-bearings 66 66 the shaft is enveloped, supported, and protected by a spool or thimble 67, having at each end a circular flange 68, secured to the respective journal 66 by nuts and bolts, as shown in Fig. 5. Thus it is apparent that the shaft is supported practically throughout its entire length. Again, there is formed an interior circular recess 70, about midway of the thimble 67, serving as a lubricating-chamber, the oil being introduced through the orifice 69, provided with a removable cap, as shown.

After the load of potatoes, vines, weeds, &c., have been elevated by means of the endless carrier in the manner before described the load is deposited in a combined agitator and separator by said carrier in the following manner: As the particular set of fingers on the cross-bar 35 reaches its highest point— that is, passes to the top of the chute—and begins its descent on its backward course, the load falls by its own weight upon the grate-bars of the aforesaid combined agitator and separator, which is placed in operative relation to the rear of the elevator-chute and in a lower horizontal plane than the mouth of the latter, so that it receives the contents of the carrier as the latter begins to descend.

Our combined agitator and separator comprises the two side pieces a a, respectively, on each side thereof, and extends rearwardly a distance equal to the length of the agitator, the bottom of which latter consists of a series of grate-bars substantially similar in construction and arrangement to those of the elevator-chute, with the exception that these grate-bars 71 71 are pivoted at their rear extremities to a transverse shaft 72, extending across the rear end of the agitator, while the forward extremities thereof are journaled in common upon a similar transverse rod 73, which in turn is flexibly suspended from the vertical oscillatory shaft 41 by means of the loosely-jointed intermediate link connection 74. By means of this construction the grate-bars 71 71 are given a vertical oscillatory motion through the medium of the links 74 74 in unison with the similar motion of the shaft 41, the operation of which has been hereinbefore described in connection with the grate-bars of the elevator-chute. The distance between any two grate-bars 71 71 is sufficiently wide to allow the egress therethrough of the potatoes, yet they are sufficiently close together to retain the vines, weeds, and large clods of dirt there deposited. The potatoes, after passing through the aforesaid grate-bars 71 71, fall down upon the dumping-chute 75, which latter consists simply of another set of grate-bars 76 76, attached at their rear extremities to a suitable rectangular frame 77, which is pendent from the agitator above, through the agency of the vertical links 78 78, loosely jointed at their respective extremities to the dumping-chute and agitator, thereby permitting the former to have a free rocking motion when actuated.

The construction of the combined agitator and separator and the dumping-chute is clearly shown in Figs. 3, 8, 9, and 10 of the drawings. As before stated, the dumping-chute 75 is situated in an oblique plane, owing to the rear links 78 78 being slightly longer than the forward ones. Thus the potatoes will by their own weight slide off and fall beneath into the receiving-cart, the side pieces 79 79 preventing any lateral discharge of the same. An oscillatory motion, similar to that of the agitator, is communicated to the dumping-chute by an eccentric motion derived from the sprocket-wheel 80 (see Fig. 1) through the eccentric lever 81, pivoted at one end to the center of the dumping-chute and at the other loosely fixed to a point on the wheel 80 between its axis and circumferential line. Motion is transmitted to the wheel 80 by its shaft, which in turn is rotated by a sprocket-wheel on the main shaft through the chain belt 33. Thus at the same time that the potatoes tend to slide down the dumping-chute 75 to the receiving-cart below they are agitated in the manner described for the purpose of extracting any objectionable matter still remaining.

As shown in Fig. 3, the upper timbers 48 48 of the elevator-chute extend rearwardly a certain distance beyond the point of termination of the chute, and 82 82 respectively designate two obliquely-upright beams securely bolted at their lower extremities to their respective timbers 48 48 and further braced and supported in their oblique position against displacement by the transverse plates 83 83.

Referring now to Figs. 3 and 4, and more particularly to Fig. 4, 84 is a compound crank-shaft journaled on each side in the beams 82 82 and carrying at one end the rigidly-keyed sprocket-wheel 85, to which latter motion is communicated by the vertical chain belt 86, worked from the sprocket 80 and passing over an arc of the sprocket 85 (see Fig. 1) and around the sprocket-pulley 87, journaled to a stud-shaft 88, as shown in Fig. 4. 89 is a movable fork or rake consisting of tines or prongs 90, bolted at their rear ends to the transverse head-piece 91. This rake 89 is rigidly secured to the forward end of lever 92, the rear end of which is provided with a longitudinal slot 93, in which latter is secured the lower end of the rigid arm 94. From this construction it will be perceived that lever 92 has a limited play at its rear end in accordance with the length of slot 93. The arm 94 is securely attached at its upper extremity to the bar 95, which latter is secured to and extends between the two beams 82 82. The crank-shaft 84 passes through a circular bearing 96 in the lever 92. Thus it is apparent that when the crank-shaft 84 is actuated by the sprocket 85 an irregular axial sweep or eccentric motion is given the rake 89, the plane of movement of which latter is shown in dotted lines in Fig. 3. This motion is peculiarly adapted for the purpose designed, and is solely due to the slotted lever 92, which is alternately reciprocated in its revolution by centrifugal force in one instance and by opposing gravity in the other. Owing to this movement the rake on reaching the point near the rear mouth of the elevator-chute makes a sudden sweep or eccentric motion, thus assuming the horizontal attitude necessary to sweep over the grate-bars of the agitator and to remove the weeds and vines commingled with the potatoes.

It is desirable in practice when the machine is idle—that is, to say, when the shovel 23' is out of the soil—to have the hinged agitator and separator elevated out of its normal horizontal plane into an out-of-the-way position. To this end we have provided means for automatically shifting the same to the desired position simultaneously with the withdrawal of the shovel 23' from the ground.

97 97 represent two vertical levers pivoted at their lower ends, one to each timber 48 of the main body, and provided with obliquely-projecting arms 98, extending upwardly at an acute angle with the lever 97 and terminating in the horizontal plate 99. (See Figs. 1 and 5.) Near the upper end of each lever 97 is secured a cleat or hook 100, to which is attached at the forward end a rope or chain 101, which in turn passes over the guiding-pulley 102, journaled to a suitable shaft at the upper extremity at each beam 82, as shown clearly in Fig. 1, and attached at its other end to a hook 103, fastened near the center of the combined agitator and separator. It will be understood that there is a lever 97 on each side of the chute, and consequently two cords 101, respectively attached to the agitator. When the shovel 23' is uplifted from the ground by the operator grasping the hand-lever 14, the plate 99 will engage with and be depressed by the rigid yoke 4 of the vehicle, thereby throwing the lever 97 forward in the direction of the arrow, Fig. 1, and consequently uplifting the hinged agitator by means of the intermediate ropes 101. As shown in Fig. 1, a number of hooks 100 are provided, so that the length of the rope may be regulated according to the height to which it is desired to shift the agitator.

By reference to Figs. 1, 2, and 8 it will be observed that the tension of both chain belts 45 and 34 is regulated by means of the pulleys 106 and 106, which are in turn respectively journaled adjustably in slotted bearings, so that the slack of the chain belts can be taken up at will. Again, by an inspection of Figs. 12 and 13 there are two guiding-pulleys 107 107, respectively placed on each side of the elevator-chute and at the bottom of the same and directly in the rear of shovel 23'. These pulleys serve to support and guide the carrier-belt 34 in its line of travel and are respectively journaled upon arbors 108 108, secured to the beams 31 31. The end of each arbor 108 108 that enters the beam 31 is screw-threaded, as shown, in a direction similar to the direction of the rotation of its pulley 107. By this arrangement the tendency of the arbor 108 to turn by friction in the direction of the revolution of the pulley is utilized to more firmly embed the same in beam 31.

The main shaft shown in Figs. 5, 6, and 7 is, as before stated, mounted in the journal 66, and, as illustrated in Fig. 7, each journal 66 is provided with a slot 109, running from the exterior surface thereof to the main shaft, whereby any foreign matter, such as dirt and dust lodged in the bearing, may find its exit through the slot 109, which therefore serves as an escape-orifice for matter forced therein by the friction of the shaft upon its bearing.

As shown clearly in Fig. 1 of the drawings, the receiving-cart 104 is removably attached to the bars 64 64 by the fastening or joint 105, so that when it is filled with the harvested potatoes it can be disconnected from the machine and another empty one substituted. The loaded cart is then taken to some suitable point where our improved assorting apparatus is located, at which point the cart is dumped and the potatoes are assorted according to their respective sizes.

Having thus fully and accurately given a detailed description of the construction of the several component parts of our invention, we will now proceed to describe the operation thereof. When the horses are hitched to the machine preparatory to starting to the field of operation, the driver first grasps the hand-lever 14 and the pawl-lever 19, shifting both in the direction of the arrow, Fig. 1, and adjusting the pawl 21 in the teeth of the sector-wheel in such position as to permanently uplift and withhold the shovel 23' from contact with the ground. Then by this action the spring-actuated clutch on the main shaft of the vehicle is simultaneously actuated, throwing the main gear-wheels out of engagement with the main spocket-wheel, so that the motion of the drive-wheels is not communicated to the other parts of the machine. At the same time that the shovel is adjusted in a permanently-elevated position the arm 99 comes into engagement with the yoke 4, thereby operating the lever 97 and shifting the agitator upwardly to an out-of-the-way position. Then the machine is free to be driven to the scene of action. In order to commence operations, the operator first releases the levers 14 and 19 and adjusts the shovel to the desired depth in the ground and then locks such position of the shovel by replacing the pawl 21 in the sector-wheel in a position corresponding to that of the shovel. The act of releasing and lowering the shovel 23' from its elevated position causes the re-engagement of the spring-actuated clutch, and consequently permits the motion of the drive-wheels to be transmitted to the chain belts 35, 45, and 86 and various other rotary parts of the machine. Furthermore, such release and depression allow the weight of the agitator to exert itself upon the ropes 101, thereby retracting the levers 97 (since yoke 4 no longer holds the arm 99 of the said lever in a depressed position) and assuming its normal horizontal position, as shown in Fig. 1. As soon as the progress of the vehicle assures the rotation of the drive-wheels the shovel 23' begins to enter the ground under the potato-hills, and the potatoes, weeds, vines, and other accompanying débris are thrown by the force and progress of the shovel back upon the portion 24 in position to be caught and carried upwardly through the elevator-chute by the carrier-fingers of the chain belt 35. Motion being communicated to the endless carrier of the elevator-chute simultaneously with the start of the shovel 23', the first set of carrier-fingers 38 38 take up that part of the potatoes, weeds, vines, &c., which are in position to be caught thereby and carries them up the elevator-chute over the oscillating grate-bars 39 39, which latter toss and shake the traveling load to a certain extent before the summit of the chute is reached, whereat the load falls by gravity upon the combined agitator and separator, and is there shaken until the potatoes and similarly-sized objects are forced through the grate-bars of said agitator down upon the said oscillating dumping-chute beneath, from whence they are guided into the receiving-cart. Throughout the operation of the machine the revolving rake 89 sweeps over the surface of the grate-bars of the agitator, throwing the vines, weeds, &c., behind the cart. Thus the operation continues indefinitely until the field is dug and harvested, the shovel continuing to force back the load within reach of the carrier-fingers, each succeeding set of which carries up the elevator-chute that portion of the potatoes, weeds, vines, &c., deposited within reach thereof.

The material, shape, size, &c., of the several parts of our invention may be changed and constructed in accordance with what experience, practice, and convenience may suggest. Furthermore, it is obvious that, if so desired, the sizes of the carrier-fingers and the several sets of the grate-bars for the elevator-chute, agitator, dumping-chute, and the assorting-hopper may be placed or spaced closer or wider apart, as occasion may demand for different-sized potatoes or other products of the soil.

Having thus described our invention, what we claim, and desire to secure by Letters Patent, is—

1. In a potato-harvester, the combination, with a plow or shovel for digging and removing the potatoes from the ground, an elevator-chute adapted to receive the load from the plow in its lower mouth, and a carrier arranged to carry the load up said chute, of a vertically-oscillatory agitator and separator at the rear mouth of the chute for receiving the load after it reaches the summit of the chute, and a reciprocating dumping-chute placed beneath the agitator and separator, substantially as described.

2. In a potato-harvester, the combination, with a plow or shovel for digging and removing the potatoes from the ground, an elevator-chute adapted to receive the load from the plow in its lower mouth, a series of vertically-oscillatory grate-bars forming the bottom of the chute, and a carrier arranged to carry the load up the chute over the grate-bars, of a vertically-oscillatory agitator and separator at the rear mouth of the chute for receiving the load after it reaches the summit of the chute, and a reciprocating dumping-chute placed beneath the agitator and separator, substantially as described.

3. In a potato-harvester, the combination, with a plow or shovel for digging and removing the potatoes from the ground, an elevator-chute adapted to receive the load from the plow in its lower mouth, and a carrier arranged to carry the load up said chute, of a vertically-oscillatory agitator and separator at the rear mouth of the chute for receiving the load after it reaches the summit of the chute, a reciprocating dumping-chute placed beneath the agitator and separator, and a receiving cart or receptacle adapted to receive the potatoes ejected from the dumping-chute, substantially as described.

4. In a potato-harvester, the combination, with a plow or shovel for digging and removing the potatoes from the ground, an elevator-chute adapted to receive the load from the plow in its lower mouth, and a carrier arranged to carry the load up said chute, of a vertically-oscillatory agitator and separator at the rear mouth of the chute for receiving the load after it reaches the summit of the chute, an axially-moving rake having an eccentric motion arranged to sweep the weeds, vines, &c., from the surface of the agitator and separator, a reciprocating dumping-chute placed beneath the agitator and separator, and a receiving cart or receptacle adapted to receive the potatoes ejected from the dumping-chute, substantially as described.

5. In a potato-harvester, the combination, with a plow or shovel for digging and removing the potatoes from the ground and throwing them back upon the machine, of an elevator-chute arranged to receive the load from the plow in its lower mouth, a series of vertically-oscillatory grate-bars forming the bottom of said chute, a traveling endless carrier arranged to travel and carry the load up the chute over the grate-bars, a combined agitator and separator at the rear mouth of the chute for receiving the load after it reaches the summit of the chute, a reciprocating dumping-chute placed in operative relation to the agitator and separator and underneath the same, and a receiving cart or receptacle adapted to receive the potatoes ejected from the dumping-chute.

6. The combination, with the side beams of the elevator-chute, of guide rails or tracks placed along the top edge thereof for the cross-bars of the traveling carrier, the traveling carrier consisting of two endless chain belts connected by transverse cross-bars spaced apart and bent upwardly at their outer ends and having lateral arms projecting from the bent portions traveling in contact with the guide-rails, and a train of gearing for transmitting motion to said carrier.

7. An elevator-chute comprising, essentially, four side beams, two on each side, arranged in different horizontal and vertical planes and having a space between their facing edges, and angle-irons or shoes for tying and binding together each set of side beams in their proper relative positions.

8. The combination, with the side beams of the elevator-chute having guide rails or tracks on their upper edges, of the traveling carrier consisting of two endless chain belts located outside of the beams and connected by transverse rods, said rods bent upwardly at their outer ends and having lateral arms projecting over the side beams from the bent portions of the rod, and dust-shields projecting on each side of the side beams and covering the chain belts and the bent portions of the transverse rods.

9. The combination, with the elevator-chute, of grate-bars extending longitudinally therethrough and forming the bottom thereof, said grate-bars being arranged in two separate series, each bolted together at the mouth of and beneath the chute by a transverse tie-rod.

10. The combination of the elevator-chute, the endless traveling carrier, the shovel or plow having a triangular-shaped point and vertical side flanges, and the shoe-casting having the vertical flanges 26 and the horizontal plate 27, by which it is attached to the side beams of the elevator-chute, and the ears 30, by which it is secured to the shovel-point.

11. The combination, with the mouth of the elevator-chute and the plow or shovel attached thereat, of a stationary transverse bar extending across the end of the chute and provided with a series of upwardly-projecting fingers, for the purpose set forth.

12. The combination, with the elevator-chute, of the grate-bars forming the bottom thereof and attached at their rear extremities to a transverse shaft, a system of levers connected to said shaft, a cam or eccentric for operating said system of levers, and a train of wheels, pulleys, and belting for transmitting motion to said cam or eccentric.

13. The combination, with the grate-bars of the elevator-chute, mounted at their upper rear extremities to a transverse shaft, of the grate-bars of the agitator, also attached to the same shaft, and a system of levers, an eccentric, and a train of belts, pulleys, and gearing for actuating said shaft.

14. The combination, with the agitator and separator, of a fulcrumed lever attached to the frame-work of the elevator-chute, a rope or other flexible connection passing over a pulley and connected, respectively, to the agitator and to the lever, a bracket-arm extending from the lever near its fulcrum in line with the rigid yoke of the vehicle, and the yoke provided with means for raising and lowering the elevator-chute.

15. The combination, with the agitator and separator having its grate-bars spaced far enough apart to permit the potatoes to drop therethrough, of an inclined dumping-chute flexibly suspended beneath said grate-bars and capable of a rocking motion, and consisting of side wings or pieces and a bottom composed of grate-bars so spaced as to retain the potatoes, a system of levers for actuating said dumping-chute, and a receiving-cart for receiving the potatoes dumped therein by the rocking of the dumping-chute.

16. The combination, with each end of the main shaft, of a clutch consisting of two interlocking sleeves located thereon, one being rigidly keyed to the shaft and the other independently movable, a grooved or slotted collar formed on the outside of the movable sleeve, a spring fastened at its upper extremity to a rigid part of the adjustable elevator-chute, its body engaging in and passing through the groove of the sleeve-collar and its lower extremity formed into an oblique downwardly and outwardly projecting top or finger passing between a spring-clamp and a part of the stationary yoke-piece of the vehicle, the spring-clamp fastened to said part of the yoke-piece, the stationary yoke-piece, and means for elevating and lowering the adjustable elevator-chute, whereby the spring is outwardly expanded by the upward movement of said chute, thereby throwing the sleeves of the clutch out of engagement.

17. The combination, with the main shaft, of its journal-bearing having a slot or recess running from the under side of the journal-bearing to the main shaft, for the purpose set forth.

18. The combination, with the beams of the elevator-chute, of chain-belt pulleys mounted on arbors secured in said beams, said arbors screw-threaded at their inner ends that enter the beams, the threads running in the direction of rotation of the pulleys, substantially as described.

19. The combination of the yoke-frame, the main wheels, and the front wheel of the elevator-chute hinged upon the main axle, the separator and agitator hinged at the upper rear end of the chute, the lever pivoted to the elevator-chute and having an extension 98 99, a cord or rope extending from the lever over a pulley on the rear end of the chute to the hinged separator, and a hand-lever for raising and lowering the front end of the chute.

20. The combination of the yoke-frame, the main axle, the supporting-wheels, the gear-wheels carried by the latter, the elevator-chute pivoted on the main axle, the endless belts carried by the chute, the shaft 66 for driving the belts, the clutch-halves 56, fixed on the shaft, the loose pinions 58, meshing with the gears on the supporting-wheels and having the clutch-halves 57, the bent arms 60 on the hinged elevator-frame, and the guides 65 in fixed relation to the yoke-frame and through which the arms 60 pass.

DAVID NEWBERRY.
JOHN NEWBERRY.

Witnesses:
A. FRANK WESTCOTT,
ALMERON MORRIS.